Figure 1:
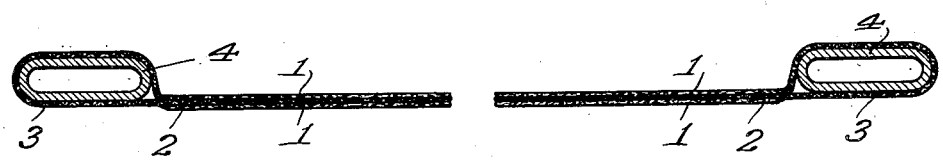

June 20, 1933.   R. C. McILROY   1,914,520
CEMENT ROAD PADDING
Filed May 22, 1931

INVENTOR-
RONALD CRAWFORD McILROY.
BY
ATTORNEY-

Patented June 20, 1933

1,914,520

UNITED STATES PATENT OFFICE

RONALD CRAWFORD McILROY, OF LEWISTON, MAINE

CEMENT ROAD PADDING

Application filed May 22, 1931. Serial No. 539,407.

My invention relates to a moisture collecting and retaining padding.

There are many instances where it is desirable to control the rate at which a substance loses its moisture, such as where a rapid drying injures the substance for the particular purpose for which it is desired. In many cases, the circumstances under which such substances are used, render the control of the loss of moisture by the substance extremely difficult. Such circumstances exist, for example, in some cement or concrete constructions, particularly concrete road constructions. When concrete is laid in road construction work, it is necessary, in order to obtain the desirable internal structure of the concrete, to prevent the concrete, and especially the exposed surface thereof, from drying too rapidly, and some means must be provided to protect the surface of the newly laid concrete and to maintain the surface in a moist condition. Commonly, the surface of the newly laid road is covered with straw and similar loose material, which is held to the surface of the road by ballast; the straw is maintained in a moist condition by being wetted periodically over a period of several days, while the concrete is setting. The material so used is discarded after the concrete has set.

In accordance with my invention, I provide a moisture collecting and retaining padding which may be applied, for example, to the surface of a concrete road, and which will maintain the surface of the concrete in condition without further attention. The padding has properties which attract moisture to it from the surrounding air and the moisture bearing materials in contact with it. The moisture so collected is retained by the padding. The material of the padding is such that it is not penetrated to any great extent by the direct rays of the sun and it adequately protects the covered substance, maintaining the surface of the substance in a moist condition. This moisture collecting and retaining padding of my invention consists of an absorbent material in the form of a padding which contains a deliquescent substance. The deliquescent substance attracts moisture from the atmosphere and moisture bearing substances with which the padding comes in contact, and the absorbent padding absorbs and retains the moisture so collected by the deliquescent substance.

This moisture collecting and retaining padding is formed by treating an absorbent material with a deliquescent substance. If a non-absorbent material is used for the padding, it is first rendered absorbent by any known method and it is then treated with a solution of a deliquescent substance.

An advantage of the padding of my invention is the fact that it may be made from practically any material which may be made absorbent.

Another advantage of my invention is the fact that the moisture collecting and retaining padding is inexpensive to manufacture and it may be used over and over again until worn out.

In manufacturing the padding of my invention, practically any material which may be rendered absorbent can be used. Examples of such material are burlap, cotton waste, felts and other fabrics, and also some non-textile materials. The material selected is first treated to render it absorbent. It is then treated with a solution of a deliquescent substance to apply the deliquescent substance uniformly throughout the material. The material so treated is then, if necessary, fastened to a base to form a continuous padding. For example, if a fabric such as cotton waste is used, it is rendered absorbent by removing the waxes therefrom, which may be done by boiling it under pressure, in pressure kiers, with caustic soda, and souring it with sulphuric acid. After the cotton waste is rendered absorbent, it is treated in the same pressure kiers with a solution of a deliquescent substance, such, for example, as calcium chloride, the solution containing two parts of water to one part of calcium chloride. The cotton waste so treated is then needle woven into a cloth base to form a continuous padding.

Figure 2:
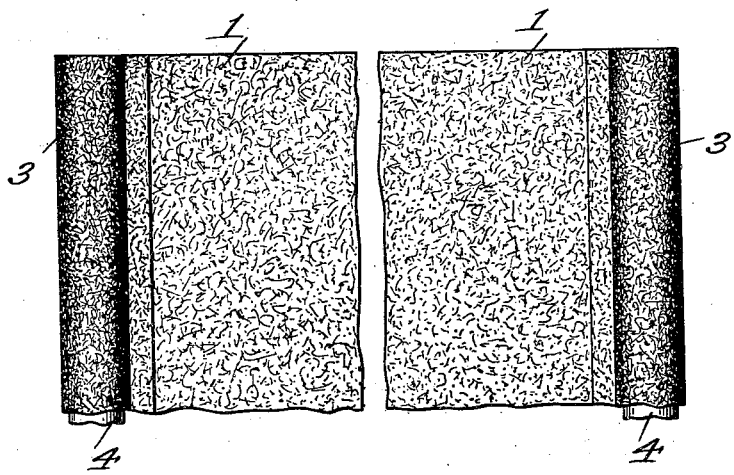

In the accompanying drawing I have illustrated a padding which is suitable for covering a road. Figure 1 of the drawing shows a transverse section of the padding and Figure 2 is a fragmentary plan of the same. In this padding, the treated cotton waste 1 is needle woven into the cloth base 2 so as to leave a margin 3 of about two inches at either side of the padding. This marginal portion is provided for encasing a flexible lead sheet or strip 4 about which the marginal portion is sewn. The lead strip on either side of the padding weighs the padding down at the edges and maintains the padding in contact with the surface of the road so that ballast is not required.

It has been found that a padding constructed in accordance with my invention remains moist under the most exacting conditions and maintains the substance over which it is laid, in a moist condition. The padding retains moisture indefinitely and may be used over and over again until worn out.

It is obvious that various changes may be made in the details of the moisture collecting and retaining padding, described above, by those skilled in the art, within the principle and scope of my invention as expressed in the appended claims.

I claim:

1. A concrete curing material for maintaining the surface of concrete constructions in a moist condition during the setting of the concrete which material comprises a base consisting of a material capable of absorbing moisture, and transmitting moisture therethrough, and a deliquescent substance for collecting and retaining moisture on the base.

2. A concrete curing padding for maintaining the surface of concrete constructions in a moist condition during the setting of the concrete which padding comprises an absorbent, fibrous, sheet material base adapted to cover the surface of concrete constructions, and a deliquescent substance for collecting and retaining moisture on the fibrous material.

3. A concrete curing padding for maintaining the surface of concrete constructions in a moist condition during the setting of the concrete which padding comprises an absorbent fabric base adapted to cover the surface of concrete constructions, and a deliquescent substance for collecting and retaining moisture on the fabric.

4. A concrete curing padding for maintaining the surface of concrete constructions in a moist condition during the setting of the concrete which padding comprises a fabric base adapted to cover the surface of concrete constructions and including an absorbent, fibrous material interwoven with a material of greater strength than the absorbent, fibrous material, and a deliquescent substance for collecting and retaining moisture on the fabric.

5. A concrete curing padding for maintaining the surface of concrete constructions in a moist condition during the setting of the concrete which padding comprises a fabric base adapted to cover the surface of concrete constructions and including a woven fabric of strong, fibrous material and an absorbent, fibrous material needle woven therein, and a deliquescent substance for collecting and retaining moisture on the base.

In witness whereof, I hereunto subscribe my signature.

R. CRAWFORD McILROY.